United States Patent Office 3,520,320
Patented July 14, 1970

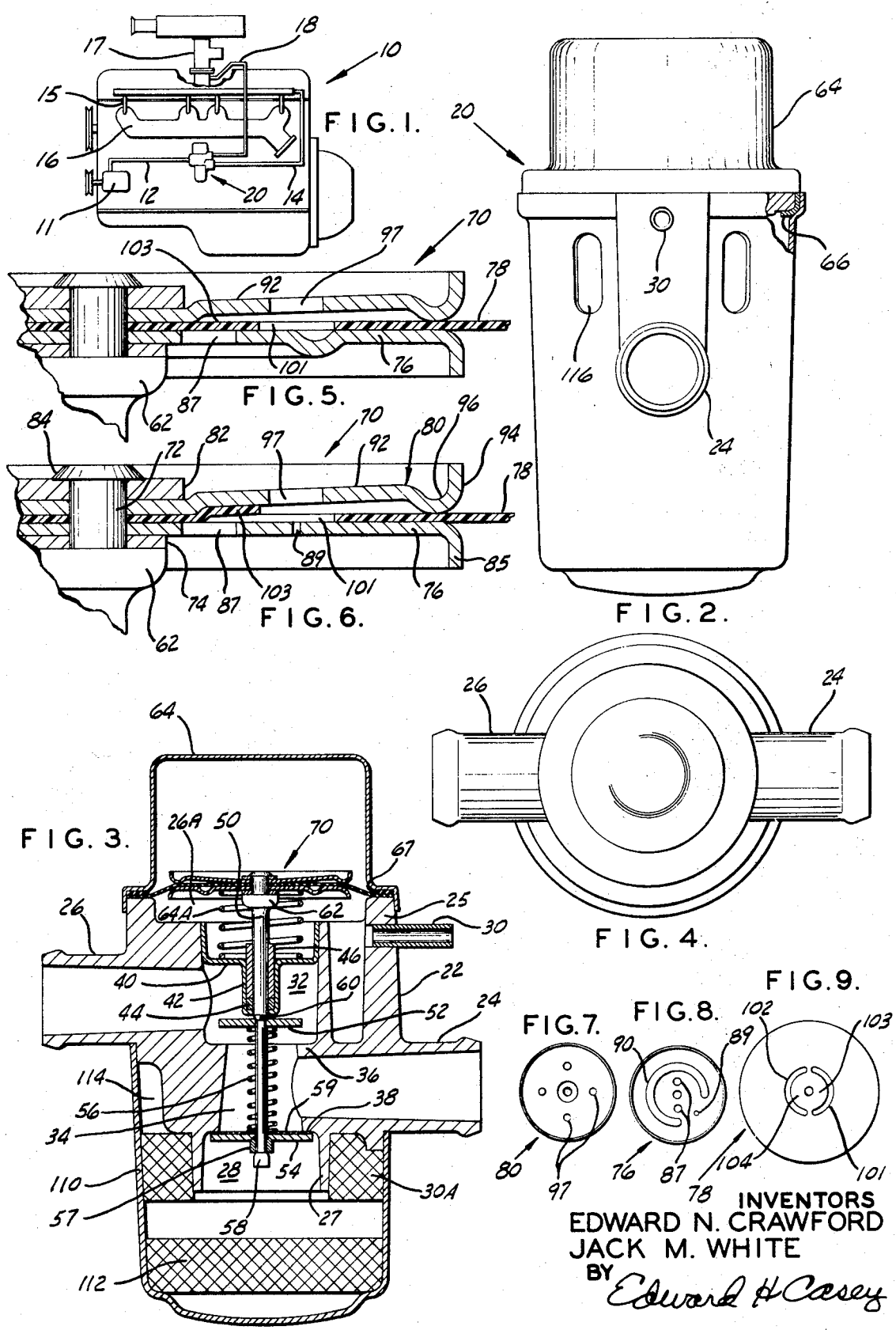

3,520,320
BY-PASS AND PRESSURE RELIEF VALVE
Edward N. Crawford and Jack M. White, Florissant, Mo., assignors to ACF Industries, Incorporated, New York, N.Y., a corporation of New Jersey
Filed Jan. 16, 1968, Ser. No. 698,341
Int. Cl. F01n *1/14, 3/00;* G05d *9/00*
U.S. Cl. 137—115            6 Claims

ABSTRACT OF THE DISCLOSURE

A diaphragm actuated by-pass and pressure relief valve having inlet, outlet and by-pass ports is spring biased to a first normal position and movable under conditions of excess pressure to a by-pass position and is also movable to the by-pass position by a change in vacuum applied to the diaphragm actuater. A muffler surrounding the by-pass port reduces the noise level of compressed air exiting from the by-pass port.

BACKGROUND OF THE INVENTION

Recently much attention has been focused on the problem of reducing pollution of the atmosphere, especially in and around large metropolitan areas. A great deal of effort has been expended on reducing pollutants emitted by factories, industrial installations and even homes. It has also been recognized that the spark ignition in internal combustion engines has been a major source of pollution, particularly in the form of unburned hydrocarbons, carbon monoxide and other noxious gases. The automotive industry has embarked on a large scale program to reduce the noxious gases emitted by passenger cars and trucks. A number of different solutions to the problem have been explored and several different ones have been adopted at least in part.

One widely adopted solution to the problem involves creation of a condition in the exhaust system of the internal combustion engine whereby additional burning is effected in the exhaust system. Such a system commonly employs an air pump which is belt driven from the crankshaft of the engine. The air pump forces air into the ejhaust manifold of the engine, preferably as near the exhaust valpes of the engine as possible. When the exhaust valves open to discharge incompletely burned gases the air mixes with the exhaust gases while they are still hot enough to support combustion and additional burning takes place so that the quantity of unburned hydrocarbons and carbon monoxide is greatly reduced. Unfortunately, such a system also creates a few problems heretofore unknown.

One such problem area arises because of the simple fact that additional burning of gases in the exhaust manifold creates additional heat. If the increased heat became great enough there could be physical damage to some of the exhaust system components. Of course at the lower speeds and lower engine loads, such as are normally encountered in city driving, the increase in heat levels is quite moderate. Under heavier load conditions and higher speeds such as encountered in steady cruising at highway conditions, the heat can be and is much greater. In order to alleviate the excessive amount of heat under steady highway cruising conditions, some air pumps have been equipped with a pressure relief valve to vent at least part of the pump output to atmosphere during those conditions. Still another problem area may arise during deceleration of the vehicle where the air injected into the exhaust manifold creates a violent type of burning which can, in some instances, result in audible backfire. This is an objectionable noise and may create pressures that could be harmful to the exhaust system. Various efforts have been made in the past to cut off the flow of air from the air pump during deceleration conditions in order to alleviate this potential backfire. The various valving arrangements for excess pressure relief and for cutting off flow of air to the exhaust manifold have resulted in undue complexity and added cost. The present invention accordingly is directed to a simplification of the overall system as well as a reduction of cost.

SUMMARY OF THE INVENTION

Applicants have devised a simple three-ported valve which serves to by-pass air to the atmosphere as required either because of higher pressures in the pumping system or because of the need for cutting off air flow to the exhaust manifold during deceleration conditions. The valve comprises a valve body having inlet, outlet and by-pass ports together with a valving member having a pair of valve closing plates. The valving member is normally biased toward a position such that one of the plates covers the by-pass port and the other plate is sufficiently removed from its seat so that air will flow through the inlet port to the outlet port. A diaphragm actuator is attached to the valve member so that manifold vacuum can overcome the biasing means to move the valve member in such a direction as to close the outlet port and to open the by-pass port. The diaphragm is enclosed within a housing and is further provided with a bleed arrangement to equalize pressures on both sides of the diaphragm so that only moderate changes in vacuum applied to the diaphragm actuator will cause it to move from one extremity to another. Also incorporated into the overall structure is a muffler to remove the audible noise when the by-pass port is open.

It is an object of the invention to provide a by-pass and pressure relief valve that is simple and of low cost construction.

It is a further object of the invention to provide a diaphragm actuated valve that will move from normal position to by-pass position upon a predetermined change in pressure on the diaphragm actuator and which will then return to normal position after a predetermined interval of time.

Still another object of the invention is to provide a diaphragm controlled valve that is spring biased to a normal position, but which will move to a by-pass position upon a predetermined increase in pressure at the valve inlet.

Yet another object of the invention is the provision of a diaphragm actuated valve having inlet, outlet and by-pass ports and which is operable against spring bias to discharge via the by-pass port, fluids whenever a condition of over pressure at the inlet or a condition of change in pressure at the diaphragm actuator exists.

These and other objects, features and advantages will be apparent on a perusal of the following description, the claims and the drawing in which:

DESCRIPTION OF THE DRAWING

FIG. 1 is a representation of an internal combustion engine with the valve of the invention installed thereon.

FIG. 2 is an elevation view partly in section of the valve.

FIG. 3 shows the valve in section.

FIG. 4 is a top plan view and,

FIGS. 5, 6, 7, 8 and 9 show details of the diaphragm strucutre of the valve.

As shown in FIG. 1, an internal combustion engine 10 is provided with an air pump 11 diven by the crankshaft of the engine by a belt, not shown. An air discharge pipe 12 is connected to the valve 20 of the invention. The valve discharges into a pipe 14 which communicates by a plurality of connecting pipes 15 to the exhaust manifold 16 of the engine 10. A carburetor 17 communicates in the usual manner with an intake manifold. Suction or vacuum sensed beneath the carburetor communicates with the diaphragm motor of the valve by way of a pipe 18.

As shown in FIG. 3, the valve is provided with a main body portion 22 which conveniently is of die cast construction. Body 22 has an inlet connection 24 and an outlet 26. Body 22 is provided with an upper rim 25 which defines a cavity 26A for receiving a portion of the diaphragm structure as will be hereinafter described. At the bottom of the body casting there depends a skirt 27 which defines a by-pass port 28. Skirt 27 also serves to center muffler element 30A which may be of any construction suitable to reduce the audible noise resulting from the passage of air through the valve. A felted muffler composed of shreded or fibrous material has been found satisfactory.

A tube 30 is pressed into a hole in the upper portion of the body and communicates at its inner end with the recess 26 and by way of its outer end with a vacuum source by way of pipe 18. Body 22 is also provided with a central bore or passageway including an upper enlarged portion 32 and a somewhat smaller portion 34. Portion 34 of the passageway communicates with the exhaust port 28. Inlet 24 communicates with the lower portion 34 of the passageway and outlet 26 communicates with the enlarged portion 32 of the passageway. The reduction and increase in diameter of the central passageway produces an upper valve seat 36 and a lower valve seat 38. It will be noted that the passageway 34 is tapered thereby providing a larger seating area at 38 than at 36. The difference in the areas of these two seats is an important aspect of the proper operation of the valve.

Press fitted into the upper passageway 32 is a cup 40 having a reduced diameter portion 42. A stem packing 44 is inserted in the bottom of the portion 42 and a press fitted guide bushing 46 retains packing 44 in proper position. If desired the packing 44 may be impregnated with a suitable lubricant. A valve stem 50 is received within the bushing 46 and has mounted upon it an upper valve member 52 and a lower valve member 54. For convenience the valve members 52 and 54 may be loosely fitted on the valve stem so that they are free to move. If this be done, a spring 56 can be placed between the valve members 52 and 54 to hold them in spaced relationship. A collar 57 surrounds the lower end of stem 50 and the end of the stem is flattened as at 58 to secure the collar to the stem and by way of the collar the valve member 54. As desired the valve member 54 can be provided with a rubber disk or other resilient member to serve as a cushion. Such a cushion is indicated at 59.

Valve stem 50 is provided with a shoulder 60 to serve as an abutment for the valve member 52 and prevent its longitudinal movement thereon. An upper portion of stem 50 is provided with an enlarged head 62 for supporting a diaphragm assembly to be described subsequently. The valve stem is surrounded by a spring or biasing member 64A, the lower end of which rests in the cup 40. The diaphragm assembly is indicated generally at 70. The outer peripheral edge of the diaphragm is secured to the upper portion of housing 22 by way of a dome or cap 64 the edges of which are crimped over rim 25 as shown at 66 to secure the diaphragm firmly in place (see FIG. 2). If desired gasketing material 67 can be utilized to effect a more perfect seal but such is not absolutely necessary.

FIGS. 5 through 9, show details of the construction of the diaphragm assembly 70. The head 62 of stem 50 is surmounted by a reduced diameter portion 72. Adjacent the head 62 there is placed a washer 74, a lower diaphragm plate 76, a diaphragm 78, an upper diaphragm plate 80 and a washer 82. The stem portion 72 is peened over as at 84 to form a head and to secure all of the components of the diaphragm assembly on the stem in leak-proof relationship. Lower diaphragm plate 76 is provided with an over turned rim 85 for stiffening purposes. A pair of apertures 87 are placed on opposite sides of the stem opening and a bleed hole 89 is also provided. An arcuate depression 90 is embossed into the surface of diaphragm plate 76. Upper diaphragm plate 80 has an annular portion 92 upwardly displaced from the central potrion, a stiffening rim or flange 94 and a depressed rib 96. During assembly the peening of the head 84 compresses the diaphragm 78 in the area surrounding stem portion 72 and also compresses the diaphragm between the rib 96 and the upper face of lower plate 76 to make a seal at both points. The portion 92 is provided with a plurality of apertures or holes 97.

Diaphragm 78 in addition to a central aperture for receiving stem 72 has two arcuate cutaway portions 101 and 102 (see FIG. 9). Because these cutaway portions do not intersect there remains a flap 103 and another flap 104 which serve as valves during operation of the assembled unit.

A muffler housing 110 is pressed onto the lower portion of the body 22 to enclose the muffler 30A. If desired it may have additional sound deadening material 112 in the bottom thereof. Air emerging from the by-pass port 28 travels downwardly to reverse its direction and pass upwardly through muffler 30A along channels 114 to emerge from openings 116 in the side of the cap 110.

The operation of the pressure relief and by-pass valve heretofore described is as follows. Assuming the engine to be running the pump 11 pumps air under pressure to the pipe 12 which is in communication with the inlet port 24. As shown in FIG. 3, the air passes from the port 24 to chamber 34 and thence out the outlet port 26. This is the normal operating position of the valve. At this time the pressures inside the cap 64 and in the space 26A are equal and the diaphragm has no effect on the operation of the valve. Assuming however, a deceleration, the vacuum applied at the pipe 30 will become greater and there will then exist a pressure differential between the interior of cap 64 and the space 26A operating to move the diaphragm downwardly. The flaps 103 and 104 seal off the openings 87 as shown in FIG. 5. The pressures however are equalized over a short interval of time because of the aperture 89, which as shown in FIG. 6, is in direct communication with the space under cap 64 by way of the opening 97 and the cut away 101 of the diaphragm. The opening 89 is a calibrated opening of such a size as to allow equalization of pressures within a period of about three to six seconds, assuming an initial differential pressure of something of the order of 5 to 7 inches of mercury.

When the diaphragm 70 has been pulled downwardly by differential pressure as described above, the valve 52 will seat against the seat 36 and will thereby open the valve 54 to permit air to exit by way of port 28. When pressure equilibrium is re-established across the diaphragm assembly 70, then the biasing spring 64A will move the assembly upwardly and the valve 54 will seat against its seat 38. The foregoing sequence of operations shuts off flow of air to the exhaust manifold 16 during the deceleration of the vehicle thereby eliminating the objectionable backfire that might occur if air were continuously injected during the deceleration.

When a vehicle is being driven at road speeds above approximately 50 m.p.h., the air pump 11 is capable of putting out greater quantities of air than are required for operation of the system. As the pumped air volume increases, pressure in the pipe 12 also increases and valve 20 then functions as an over pressure relief valve. As noted previously the area of seat 36 is smaller than the area of seat 38. When the pressure in the space 34 becomes great enough the resultant force exerted against valve head 54 begins to overcome the bias of spring 64A and some air will be exhausted by way of port 28. As engine speeds increase valve head 54 moves downwardly with increase in pressure to by-pass greater amounts of air and to thereby maintain pressure in outlet port 26 substantially constant. With a proper selection of head and seat sizes and proper selection of the biasing spring 64A, it is possible to insure that surplus air is by-passed away from the engine at speeds exceeding any predetermined speed. It is also possible through possible selection of these variables to insure that there is always air available in the exhaust manifold for burning additional hydrocarbon and that this air be made available at a predetermined pressure. In any event it is clear that the device can be operated in such a manner as to prevent an excessive combustion in the exhaust manifold 16 which in turn will prevent overheating of the manifold.

It is apparent that diaphragm assembly 70 can return to its normal position rapidly. Assuming assembly 70 is in the down position, vacuum will exist above it inside the cap 64. A sudden acceleration will increase the pressure in the intake manifold, thereby reversing the pressure differential across diaphragm assembly 70 and this reversed pressure will raise the flaps 103, 104 to allow air to move rapidly by way of ports 87 and 97 to equalize the pressure inside cap 64 and in space 26A. This action is shown in FIG. 6.

We claim:
1. A diaphragm actuated by-pass and pressure relief valve comprising:
   (A) a valve body having inlet, outlet and by-pass ports,
   (B) a first valve seat between said inlet and outlet ports,
   (C) a second valve seat between said inlet and by-pass ports,
   (D) a passage between said seats,
   (E) a valve stem having affixed thereto a pair of valve heads, one for each of said seats,
   (F) a diaphragm assembly secured to an end of said stem, biasing means for urging said diaphragm assembly toward a first position, said diaphragm assembly being disposed between a rim portion of the said body and a cup-shaped cover member and secured thereby to said body,
   (G) a conduit communicating at one end with a source of negative pressure and at its other end with a space between the said diaphragm assembly and an end of said body defined by said rim and
   (H) the said second valve seat having a greater diameter than the said first valve seat whereby an over pressure condition causes the said valve head for the said second valve seat to lift off said seat to relieve said over pressure.

2. The valve of claim 1 further including muffler means surrounding said by-pass port and a cover member for housing said muffler.

3. The valve of claim 2 further including a channel in said body a cover member surrounding a portion of said body and said channel and an opening in said cover member whereby fluids emerging from said by-pass port will pass through said muffler, along said channel and out said opening.

4. The valve of claim 1 in further comprising bleed means in said diaphragm assembly and flap valve means in said assembly whereby said assembly upon imposition of a differential pressure can move slowly in one direction and rapidly in another direction.

5. The valve of claim 4 further comprising spring means surrounding said stem to bias said valve heads in opposite directions and valve head positioning means for each of said valve heads.

6. The valve of claim 5 further comprising guide means for said stem, said guide means being positioned on said stem by a cup-shaped member retained in said body above said first valve seat, said cup-shaped member also retaining a biasing spring for biasing said diaphragm assembly toward said first position.

References Cited
UNITED STATES PATENTS 3,430,437    3/1969    Saussele et al. _____ 60—30

FOREIGN PATENTS 809,637    12/1936    France.

OTHER REFERENCES

Product Engineering, July 3, 1967, p. 61, Fresh Air Supply Helps to Cut Down Auto Pollution.

ROBERT G. NILSON, Primary Examiner

U.S. Cl. X.R.

60—30; 137—119